US009653932B2

(12) United States Patent
Petrie, IV et al.

(10) Patent No.: US 9,653,932 B2
(45) Date of Patent: May 16, 2017

(54) PORTABLE CATHODIC PROTECTION CURRENT INTERRUPTER

(71) Applicant: TAKU ENGINEERING, LLC, Anchorage, AK (US)

(72) Inventors: Charles W. Petrie, IV, Girdwood, AK (US); Eric G. Weiler, Anchorage, AK (US); Chism L. Henry, Girdwood, AK (US)

(73) Assignee: TAKU ENGINEERING, LLC, Anchorage, AK (US)

( * ) Notice: Subject to any disclaimer, the term of this patent is extended or adjusted under 35 U.S.C. 154(b) by 159 days.

(21) Appl. No.: 14/658,117

(22) Filed: Mar. 13, 2015

(65) Prior Publication Data
US 2016/0268078 A1 Sep. 15, 2016

(51) Int. Cl.
G01N 27/42 (2006.01)
H02J 7/00 (2006.01)
C23F 13/22 (2006.01)

(52) U.S. Cl.
CPC ............ *H02J 7/0042* (2013.01); *C23F 13/22* (2013.01); *H02J 7/0047* (2013.01); *H02J 2007/005* (2013.01)

(58) Field of Classification Search
CPC ................................ G01N 27/42; G01N 31/02
USPC ......................................................... 324/425
See application file for complete search history.

(56) References Cited

U.S. PATENT DOCUMENTS

| 4,812,766 | A | 3/1989 | Klein |
| 6,954,071 | B2 | 10/2005 | Flatt et al. |
| 7,027,957 | B2 | 4/2006 | Fourie et al. |
| 7,582,195 | B2 | 9/2009 | Benham |
| 7,901,546 | B2 | 3/2011 | Miller et al. |
| 8,298,382 | B2 | 10/2012 | Hanlon et al. |
| 2002/0008042 | A1* | 1/2002 | Pierro, Jr. ............. G01N 17/02 205/777.5 |
| 2002/0196008 | A1* | 12/2002 | Hilleary ................. C23F 13/22 324/72 |
| 2006/0065551 | A1* | 3/2006 | Howard, Jr. ........... C23F 13/04 205/740 |
| 2006/0203411 | A1 | 9/2006 | Fourie et al. |
| 2011/0199040 | A1* | 8/2011 | English ................ H02J 7/0073 320/101 |
| 2012/0205256 | A1 | 8/2012 | Catte |

FOREIGN PATENT DOCUMENTS

| JP | 2012-87351 | 5/2012 |
| RU | 2 102 532 C1 | 1/1998 |
| RU | 2 447 425 C1 | 4/2012 |

* cited by examiner

*Primary Examiner* — Arun Williams
(74) *Attorney, Agent, or Firm* — Richard C. Litman

(57) ABSTRACT

The portable cathodic protection current interrupter is a programmable, portable current interrupter for selectively controlling current interruption to a cathodic protection system. A processor and a voltage regulator are disposed within a portable housing and are in communication with one another. The voltage regulator is adapted for communication with an external power source. A display and a user interface are each mounted on the portable housing. An onboard clock is in communication with the processor for controlling the frequency and duration of current interruption signals. A global navigation satellite system receiver is provided for synchronizing a time signal of the onboard clock. At least one on-board relay is provided for communication with the cathodic protection current source for selectively interrupting current thereto. The portable cathodic protection current interrupter provides selective switching of the relay(s) between a main interruption channel, a testing interruption channel, and an external interruption channel.

14 Claims, 14 Drawing Sheets

PORTABLE CATHODIC PROTECTION CURRENT INTERRUPTER

BACKGROUND OF THE INVENTION

1. Field of the Invention

The present invention relates to cathodic protection for the prevention of corrosion, and particularly to a portable cathodic protection current interrupter for providing programmable current interruption to cathodic protection current sources.

2. Description of the Related Art

Cathodic protection (CP) is a technique used to control the corrosion of a metal surface by making it the cathode of an electrochemical cell. A simple method of cathodic protection connects protected metal to a more easily corroded "sacrificial metal" to act as the anode. The sacrificial metal then corrodes instead of the protected metal. For structures such as long pipelines, where such passive galvanic cathodic protection is not adequate, an external DC electrical power source is used to provide sufficient current. In the latter case, impressed current cathodic protection (ICCP) systems are used. These consist of anodes connected to a DC power source, which is often a transformer-rectifier connected to AC power.

For pipelines, anodes are arranged in groundbeds, either distributed or in a deep vertical hole, depending on several design and field condition factors, including current distribution requirements. Cathodic protection transformer-rectifier units are often custom manufactured and equipped with a variety of features, including remote monitoring and control, integral current interrupters and various types of electrical enclosures.

For pipelines buried in soil, the applied current changes the voltage across the metal/soil interface, thereby changing the electrochemical state of the structure so that corrosion is mitigated. The voltage across the metal/soil interface is monitored to determine if adequate protection is being achieved. The measured voltage level is typically referred to as a "pipe-to-soil" potential. Various criteria are used in the industry to determine if the pipe-to-soil potential has been shifted sufficiently to mitigate corrosion. The most common criterion is that the potential difference, while the cathodic protection circuits are switched on, is more negative than −0.85 V vs. a calibrated copper/copper sulfate reference electrode. However, an error can be introduced in the measurement if taken while the cathodic protection circuits are switched on. In order to eliminate this error, all influencing sources of cathodic protection current are switched off simultaneously and the pipe-to-soil potential is measured (typically within one second or less) after switching the current off. Such a test is referred to as an "interrupted survey".

In order to facilitate an interrupted survey, it is typical to temporarily install portable current interrupters into the cathodic protection circuit for the duration of the test. Interrupters are devices that synchronously cycle the current output of cathodic protection systems between "on" and "off", allowing an interrupted survey to be carried out. For the results to be valid, it is necessary to interrupt all of the influencing cathodic protection current sources. The interrupter is typically connected to a relay, often of the mechanical or solid state type. On some portable interrupters, this relay forms an integral part of the portable interrupter, all packaged into what is typically a relatively bulky enclosure. One disadvantage of this configuration is that the user is limited to a relay of only one particular type and capacity, and is further limited to only one relay per portable interrupter, thus necessitating the use of multiple portable interrupters at a location where multiple current sources need to be interrupted (e.g., locations where multiple cathodic protection rectifiers are installed in close proximity of each other).

In the above, it is important to note that interruption is performed on cathodic protection current output of both cathodic protection rectifiers and sacrificial galvanic anodes. It is common to also interrupt cathodic protection "coupons" from the system for cathodic protection coupon surveys, where cathodic protection coupons are samples of the same material that the protected structure is made from. These coupons are electrically connected to the structure (e.g., a pipe, tank, etc.). Since the coupons are also connected, they receive the same cathodic protection current from the sources (i.e., the rectifiers and galvanic anodes). By interrupting just the connection of the cathodic protection coupon from the structure, a cathodic protection coupon survey that is representative of the structure may be performed. Thus, it should be understood that cathodic protection current interruption is not only performed on cathodic protection rectifiers, but general cathodic protection systems, including rectifiers, sacrificial galvanic anodes and coupons.

Portable interrupters are typically powered in a number of ways. One common method is to connect the interrupter to available primary AC supply, typically 110V or 220V, present in many cathodic protection rectifiers. The internal electronic circuitry of portable interrupters operates off low voltage DC. Some portable interrupters have AC to DC converters built in for this purpose, while others require an external AC/DC converter and accept a 12V DC power input. Sometimes an AC voltage supply is not available, for example, if the cathodic protection rectifier is powered from solar power or with a thermal generator, or if the cathodic protection system is a sacrificial system. In these situations, it is customary to power the portable interrupter with a battery having sufficient charge capacity to last the duration of a test. In some instances, a test may last for a number of days, or even one week or more, and a battery with substantial charge capacity, such as a rechargeable lead-acid automotive battery having a charge capacity of 40 ampere-hours or more may be required. Such batteries are usually bulky, heavy, and inconvenient to use.

Thus, a portable cathodic protection current interrupter solving the aforementioned problems is desired.

SUMMARY OF THE INVENTION

The portable cathodic protection current interrupter is a programmable, portable current interrupter for selectively controlling current interruption to a cathodic protection rectifier or general cathodic protection system. A processor and a relay are disposed within a portable housing and are in communication with one another. The relay is adapted for communication with the cathodic protection rectifier or general cathodic protection system. A display and a user interface are each in communication with the processor and are mounted on the portable housing. An onboard clock is also disposed within the housing and is in communication with the processor for controlling the frequency and duration of current interruption signals. A global navigation satellite system (GNSS), such as the global positioning system (GPS), receiver is provided for synchronizing the time signal of the onboard clock. Computer readable memory is also disposed within the housing and is in communication with the processor.

At least one on-board relay is also in communication with the processor and for communication with the cathodic protection rectifier for selectively interrupting current thereto. The portable cathodic protection current interrupter provides selective switching of the at least one relay between a main interruption channel, a testing interruption channel, and an external interruption channel, where the main interruption channel operates over a number of user-selectable on-off current interrupter cycles, the testing interruption channel operates over a larger number of user-selectable on-off cycles, and the external interruption channel is adapted for controlling an external relay. It should be understood that while each channel performs testing in a general sense, the testing interruption channel performs special testing, such as interruption of a cathodic protection coupon on a different cycle from the remainder of the cathodic protection system.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
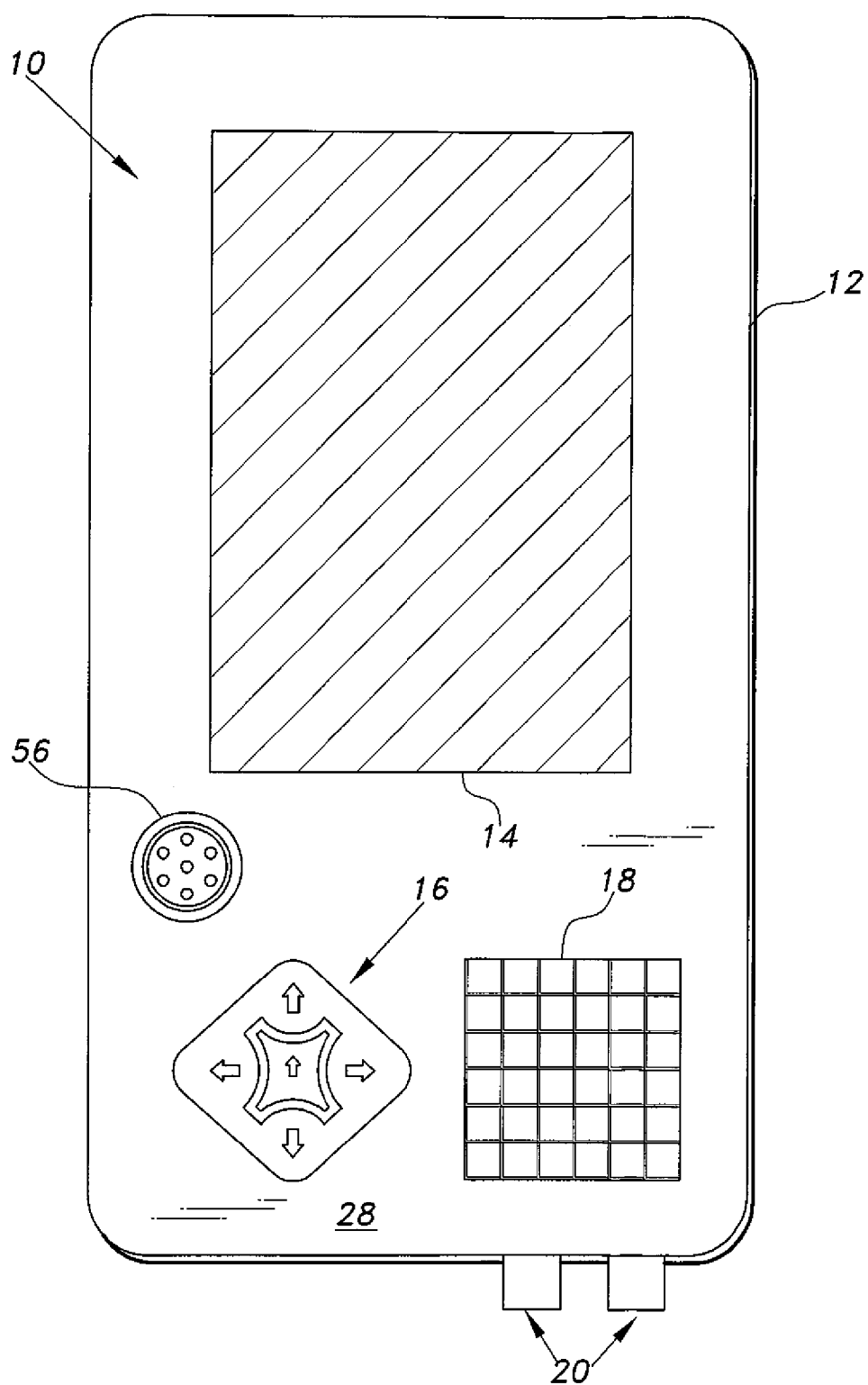
FIG. 1 is a front view of a portable cathodic protection current interrupter according to the present invention.

The portable cathodic protection current interrupter 10 is a programmable, portable current interrupter for selectively controlling current interruption to an external cathodic protection system through a relay. As described above, current interruption may be performed on a cathodic protection rectifier, a cathodic protection coupon, or a general cathodic protection system. As shown in FIG. 1, the portable cathodic protection current interrupter 10 includes a rugged, lightweight housing 12. A display 14 and user interface 16 are each in communication with a processor 32 mounted within the housing 12 and are each mounted on the front face 28 of the housing 12. It should be understood that the display 14 may be any suitable type of display, such as an electronic ink display (similar to those used in ebook readers), a liquid crystal display or the like. Similarly, although shown as an exemplary directional pad, it should be understood that the user interface 16 may be in the form of any suitable type of interface for entering data or commands, such as switches, buttons, a touchscreen or the like. Additionally, as shown, one or more solar panels 18 may be mounted on the housing 12 for powering the portable cathodic protection current interrupter 10 and/or recharging a rechargeable battery disposed within the housing 12.

Figure 2:
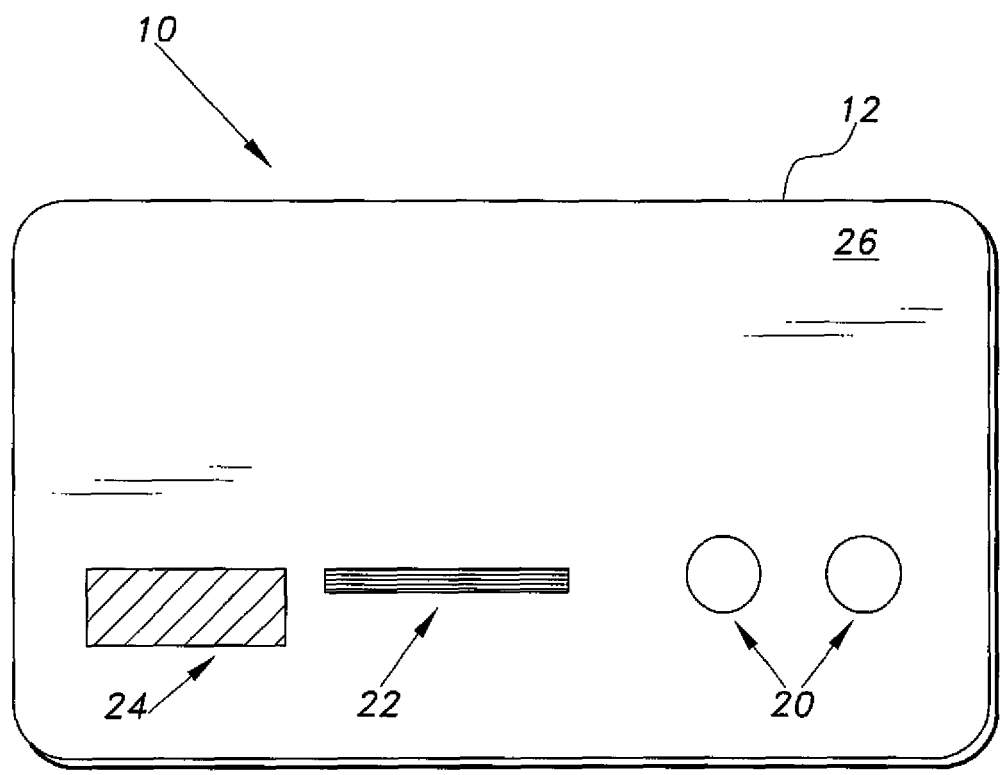
FIG. 2 is a bottom view of the portable cathodic protection current interrupter according to the present invention.
Figure 3:
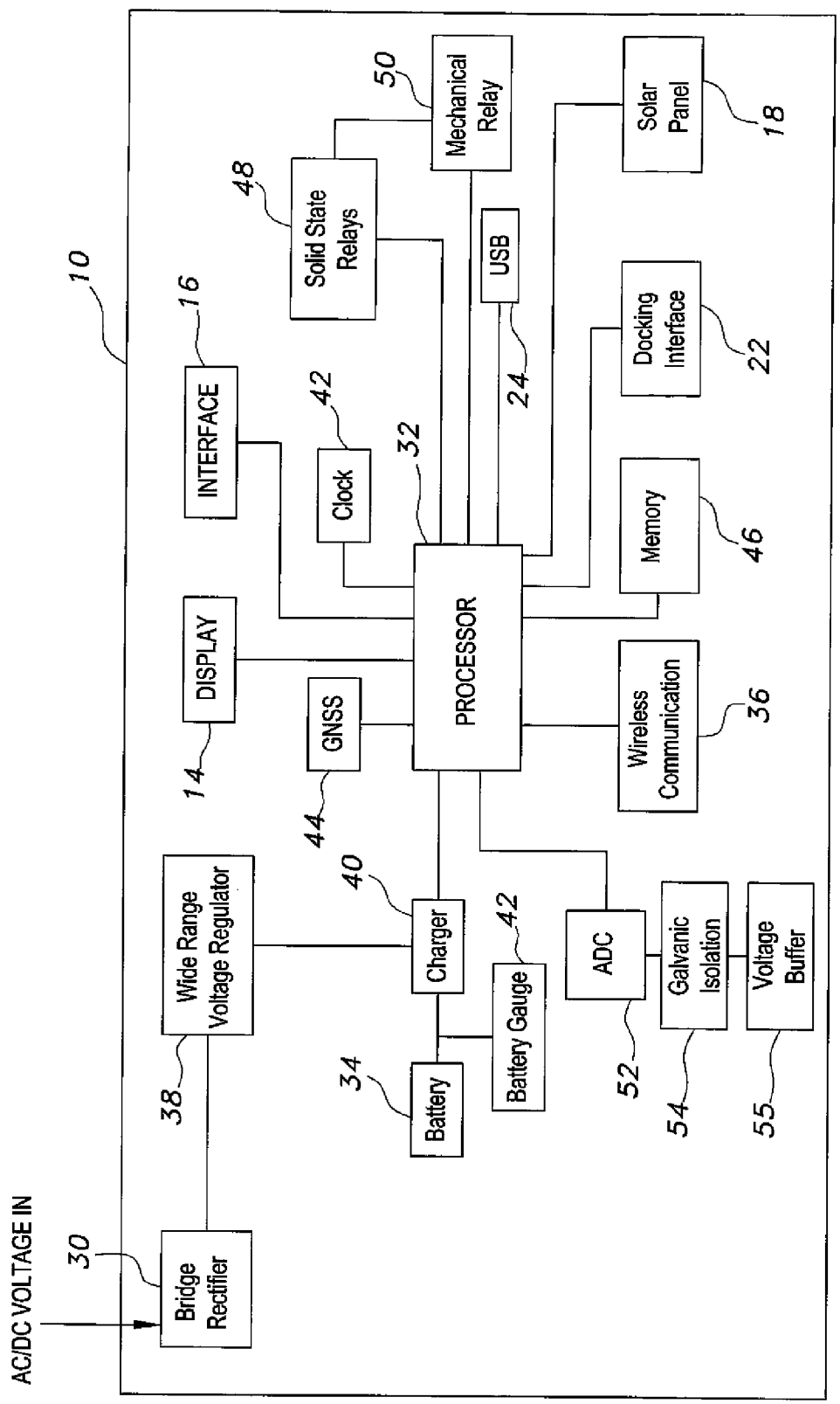
FIG. 3 is a block diagram of the portable cathodic protection current interrupter according to the present invention.

As best shown in FIG. 2, ports 20 are provided for electrical connection to the cathodic protection system. In FIG. 2, the ports 20 are shown as a pair of conventional banana jack connections, although it should be understood that any suitable type of electrical ports or sockets may be utilized. Further, although shown as being mounted on the bottom surface 26 of the housing 12, it should be understood that the ports 20 may be located at any desired position on housing 12. Further, communication interfaces, such as a universal serial bus (USB) port 24 and a docking interface 22 may be provided, if desired. The docking interface 22 is similar to the interface port for the docking of wireless devices, such as cellular telephones and the like. As shown in FIG. 3, the USB port 24 and the docking interface 22 may be part of an overall communication sub-system, including a wireless communication system 36, allowing for control signals to be input to the processor 32 by an external device, such as a portable, wireless device (e.g., a cellular telephone, a personal digital assistant, or the like), as well as transferring output data to the external device. Alternatively, communication may be by wired connection (through the USB port 24 or the docking interface 22) or via an additional wired communication transceiver. The USB port 24 and the docking interface 22 may be further utilized for charging the rechargeable battery 34. In addition to providing control and programming input, as well as battery charging, the USB port 24 may be used to download data stored in onboard memory 46 (to be described in greater detail below). The docking interface 22 may further serve as a high current relay interface. It should be understood the rechargeable battery 34 may be any suitable type of rechargeable battery, such as a 2,000 mAh lithium polymer battery or the like.

The processor 32 is in communication with a wide range voltage regulator 38, which is in communication with the bridge rectifier 30, allowing for external power input, as will be described in greater detail below, via ports 20. As shown in FIG. 3, the wide range voltage regulator 38 may be in communication with a battery charger 40 for charging the rechargeable battery 34 via power received from the external power supply through bridge rectifier 30. A battery gauge 42 may be mounted on the housing 12 or be integrated into the display 14 for visually displaying the charge state of the battery 34. The wide range voltage regulator 38 in communication with the charger 40 allows the rechargeable battery 34 to be charged from a variety of power sources, typically ranging from 7 V to 24 V, either AC or DC. It should be understood that this voltage range is provided for exemplary purposes only.

In the above, it should be understood that voltage regulator 38 is not necessarily in communication with just a cathodic protection rectifier or cathodic protection system (through bridge rectifier 30). Voltage regulator 38 may be attached to a wide variety of external power supplies for charging through bridge rectifier 30. Although the cathodic protection rectifier may provide this power, any suitable external power source may also be provided for charging battery 34.

Further, an analog-to-digital converter 52 is preferably provided for communication with one or more voltage buffers 55 and/or galvanic isolation components 54. The analog-to-digital converter 52 is preferably a two- or three-channel, high sample frequency type capable of reading both AC and DC voltage simultaneously. The analog-to-digital converter 52 may alternatively be replaced by a multimeter, allowing for contact resistance reading capability for verification of adequate reference cell-to-soil interfaces. Simultaneous AC and DC current measurements for the main interruption channel and the testing channel outputs (to be described in detail below) could also be performed. Voltage and current readings may then be stored in onboard memory 46 (described in greater detail below).

An onboard clock 42 is also disposed within the housing 12 and is in communication with the processor 32 for controlling the frequency and duration of current interruption signals being generated by the processor 32. Alternatively, a clock or timer may be integrated into the processor 32, as is well known in the art. A global navigation satellite system (GNSS), such as the global positioning system (GPS), receiver 44 is preferably provided for synchronizing the time signal of the onboard clock 42. It should be understood that the processor 32 may be associated with, or incorporated into, any suitable type of computing device, for example, a personal computer or a programmable logic controller, or may be a microcontroller. It should be understood that the various system components shown in FIG. 3 are in communication with one another, and with the processor 32 by any suitable type of data bus, as is well known in the art. Additionally, computer readable memory 46 is also disposed within the housing 12 and is in communication with the processor 32. Examples of computer-readable recording media include non-transitory storage media, a magnetic recording apparatus, an optical disk, a magneto-optical disk, and/or a semiconductor memory (for example, RAM, ROM, etc.). Examples of magnetic recording apparatus that may be used in addition to memory 46, or in place of memory 46, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

At least one on-board relay is also in communication with the processor 32 for communication with the cathodic protection system for selectively interrupting current thereto. Preferably, both solid-state relays 48 and at least one mechanical relay 50 are provided. The portable cathodic protection current interrupter 10 provides selective switching of the relays 48, 50 between a main interruption channel, a testing interruption channel, and an external interruption channel, where the main interruption channel operates over a number of user-selectable on-off current interrupter cycles, the testing interruption channel operates over a larger number of user-selectable on-off cycles, and the external interruption channel is adapted for controlling an external relay. It should be understood that while each channel performs testing in a general sense, the testing interruption channel performs special testing, such as interruption of a cathodic protection coupon on a different cycle from the remainder of the cathodic protection system. As shown, solid-state relays 48 and mechanical relay 50 are tied together for controlling three possible external components, namely a sacrificial galvanic anode system, a cathodic protection coupon and/or an external relay (connected to an impressed current cathodic protection system).

The main interruption channel operates similar to a conventional instant-off survey galvanic interruption switching channel, providing simple on-off control to relays 48, 50, and has a maximum current handling of 1 A and a maximum voltage handling of 20 V. It should be understood that these current and voltage maxima are provided for exemplary purposes only. The user may control total length of the cycle, the duration of the "off" portion of the cycle, a start time (i.e., a time of day at which current interruption will start) and an end time (i.e., a time of day at which current interruption will cease). As described above, the user-selectable control data may be entered via interface 16 or, alternatively, via an external device through wireless communication system 36, USB port 24 or docking interface 22. In the main interruption channel, the ports 20 are not polarity sensitive. The main interruption channel is similar to a conventional galvanic interruption channel, providing standard on-off cycles between 1 second and 30 seconds.

In the testing (or "coupon") channel, the portable cathodic protection current interrupter 10 can provide complex interruption cycles. The maximum current handling in the testing channel is 1 A and the maximum voltage handling is 20 V. It should be understood that these current and voltage maxima are provided for exemplary purposes only. The connection for the testing channel may be in the form of a conventional seven-pin connector 56 or the like. It should be understood that the positioning of seven-pin connector 56 in FIG. 1 is shown for exemplary purposes only. It should be further understood that any suitable type of connector may be utilized. For such a seven-pin connector, conventional alligator leads for the testing channel connections may be provided by a conventional seven-pin charge adapter cable. As with the main interruption channel, the testing channel is not polarity sensitive.

The testing channel allows a technician to set up an interruption cycle with up to five on-off cycles. The cycles can be set to start with either an "on" or an "off", and times set to zero are ignored by the system. Each non-zero time is an "on" or an "off", depending on the starting polarity and the delays prior to the time. As noted above, display 14 and interface 16 provide a graphical user interface for use by the user for programming the portable cathodic protection current interrupter 10 (with additional programming and control being possible from an external device via USB connection 24, docking interface 22, and wireless communication system 36). Preferably, the display 14 provides the user with a series of menus, allowing for easy entry of control data. As an example, the user may set the portable cathodic protection current interrupter 10 in the testing channel to start the cycle "on" for a cycle length of 4 seconds, with a "Time 1" setting of 0 ms, a "Time 2" setting of 500 ms, a "Time 3" setting of 1,500 ms, and a "Time 4" setting of 0 ms. Such programming would result in an on-off cycle as follows: "on" for 500 ms, "off" for 1,500 ms, and "on" again for 2,000 ms, for a total of 4,000 ms (4 sec). It should be noted that the total cycle length was set to 4 seconds, but the total of Times 1-4 was only 2 seconds. The remainder of the cycle that is not accounted for in Times 1-4 is filled with the opposite polarity of the last non-zero set delay. In this example, the unaccounted for time is 2,000 ms and the last non-zero time setting is an "off", leaving a remainder of 2,000 ms "on".

In a second example in the testing channel, the user may set the portable cathodic protection current interrupter 10 in the testing channel to start the cycle "off" for a cycle length of 4 seconds, with a "Time 1" setting of 300 ms, a "Time 2" setting of 700 ms, a "Time 3" setting of 1,500 ms, and a "Time 4" setting of 500 ms. Such programming would result in an on-off cycle as follows: "off" for 300 ms, "on" for 700 ms, "off" for 1,500 ms, and "on" again for 2,000 ms, for a total of 4,000 ms (4 sec). Via the graphical user interface, the user may enable or disable the testing channel interruption, set the total length of the cycle (i.e., the sum of all delays), set the polarity of the first delay (i.e., "on" or "off"), and set the delay time for the first, second, third, etc. times.

In the main interruption channel, the total length of the cycle is preferably programmed in seconds, the total length being evenly divisible into 60 seconds (i.e., the total length is in minutes). In the testing channel, the total length of the cycle is also preferably in seconds, and is also evenly divisible into 60. In the main interruption channel, the graphical user interface allows the user to program the cycle length, the "off" length (i.e., the length of the "off" portion of the cycle in milliseconds), the start time and the end time, as described above.

The external interruption channel is used to drive an external, high-current relay. The connection for the external interruption channel may be the seven-pin connector 56, as described above with regard to the testing channel. The external relay may be connected using a conventional seven-pin to seven-pin cable, the portable cathodic protection current interrupter 10 receiving power from the power supply in the external relay (also providing charging for the battery 34 via charger 40, which may also serve as a voltage regulator) when connected. Preferably, up to ten high current relays may be daisy chained to operate from the portable cathodic protection current interrupter 10.

The external interruption channel uses the "cycle" and "off" settings from the main interruption channel, as described above, allowing the user to program (via the graphical user interface) the portable cathodic protection current interrupter 10 to enable or disable interruption to the external relay. It should be noted that when the external interruption channel is enabled, the main interruption channel and the testing channel are disabled. The user may also program the "on" dwell time compensation for the external relay (in ms), the "off" dwell time compensation for the external relay (in ms), and the polarity, allowing the external output to be set for a normally closed (N/C) or normally open (N/O) relay. Preferably, the portable cathodic protection current interrupter 10 is further provided with a sensor return line to allow bi-directional communication with "smart" external relays. This would allow the interrupter 10 to automatically configure key settings and compensate for individual switch parameters, such as dwell time (i.e., the time it takes the switch to engage or disengage).

The graphical user interface may also provide the user with menus offering further auxiliary functions, apart from typical cathodic protection survey tasks, such as those described above. For example, the user may program the portable cathodic protection current interrupter 10 to perform GPS time synchronization (via GPS receiver 44 in communication with onboard clock 42) continuously (as needed) or only once, at startup of the interrupter 10. This allows the interrupter 10 to be GPS time synchronized in full view of the sky, and then be moved to a location with no GPS reception (for example, inside a building), maintaining the interrupt being based on a highly accurate clock signal. In this mode, the interrupter 10 should have a maximum drift of only 55 ms per 12 hours. As a further alternative, the graphical user interface may allow the user to set the interrupter 10 to start interruption cycles in either "off" (i.e., the current industry standard) or in the relatively uncommon "on" for the main interruption channel and the external interruption channel.

It should be understood that the processor 32 may include any desired programming beyond the examples given above, such as self-monitoring and self-diagnostic routines, along with logging of internal operations (in memory 46). As a further example, the processor 32 may be programmed to perform waveform analysis, as is conventionally known, in order to automatically identify discrete "on" and "instant off" readings in waveforms, with suspect waveforms/readings being flagged. Further, via the USB port 24, the docking interface 22, or any other suitable interface or port, the interrupter 10 may be used, in conjunction with suitable programming, with external peripherals, such as additional sensors, switches, thermometers, microphones, etc., and may be further used as a controller for motors, lights, valves, displays, etc.

In order to reduce the time needed to complete the overall survey and increase accuracy, the portable cathodic protection current interrupter 10 makes use of waveform analysis performed by the processor 32. As will be described in greater detail below, the waveform analysis identifies changes in slope that coincide with cathodic protection system state changes. Based on the number and type of slope changes identified, the system can identify the type of waveform with which it is working. Once the system has identified the particular type of waveform, it can then identify the correct data points for the current "on", current "interrupt/off", and depolarization readings. Additionally, from this analysis, the system can further determine if the cycle length needs adjustment.

Figure 4A:
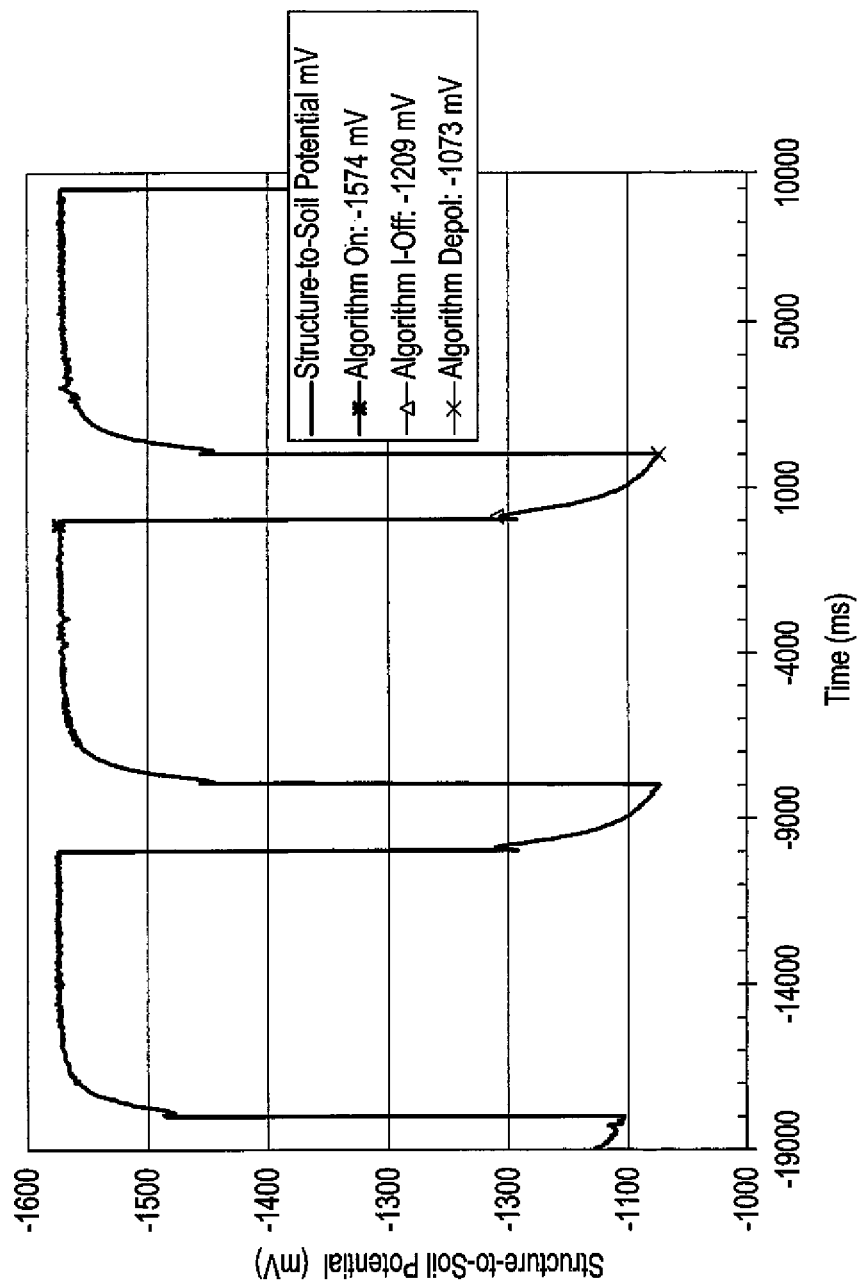
FIGS. 4A, 4B, 4C, 4D, 4E, 4F, 4G, 4H, 4I, 4J and 4K are exemplary structure-to-soil potential plots used in waveform analysis performed by the portable cathodic protection current interrupter according to the present invention.

As described above, cathodic protection current interruption is based on the measured "pipe-to-soil" or "structure-to-soil" potential. As shown in the exemplary plot of FIG. 4A, the waveform analysis begins by (a) buffering incoming data representative of cathodic protection current samples obtained by the portable cathodic protection current interrupter 10 and stored in memory 46. The dataset is then (b) low pass filtered and minimum and maximum values are recorded. Then, (c) current low pass filtered data being presently collected is compared against the recorded minimum and maximum values. If the current data is closer to the minimum value than the maximum value, then a variable, minCount, is incremented by one, where minCount represents a number of data points closer to the minimum value than the maximum value. If the current data is closer to the maximum value than the minimum value, then another variable, maxCount, is incremented by one, where maxCount represents a number of data points closer to the maximum value than the minimum value. Next, at step (d), each time the minimum or maximum values change considerably, minCount and maxCount are zeroed, and the count for each is re-counted from buffer memory based on the new maximum and minimum values. At step (e), when minCount and maxCount reach a relationship that is indicative of a cathodic protection interruption cycle, then the smaller of minCount and maxCount is determined to be representative of an "off" portion of the cathodic protection interruption cycle, and the larger of minCount and maxCount is determined to be representative of an "on" portion of the cathodic protection interruption cycle. At step (f), the polarity of the "on' portion of the cathodic protection interruption cycle and the polarity of the "off" portion of the cathodic protection interruption cycle are recorded in the memory and represented, respectively, by the variables onPolarity and offPolarity. Next, at step (g), a variable onCount is established and is representative of a duration of the "on" portion of the cathodic protection interruption cycle and is derived from the larger of minCount and maxCount. Also, a variable offCount is established and is representative of a duration of the "off" portion of the cathodic protection interruption cycle and is derived from the smaller of minCount and maxCount. At step (h), an on reference voltage, corresponding to the "on" portion of the cathodic protection interruption cycle, and an off reference voltage, corresponding to the "off" portion of the cathodic protection interruption cycle, are set to the recorded minimum value and the recorded maximum value, respectively. Steps (a) through (h) are performed continuously while performing an analysis loop (described below), and analysis is restarted whenever the cycle appears to have changed. After two contiguous waveforms are successfully analyzed, the system 10 may display the waveforms to the user and ask for confirmation of success before continuing the survey.

Figure 4B:
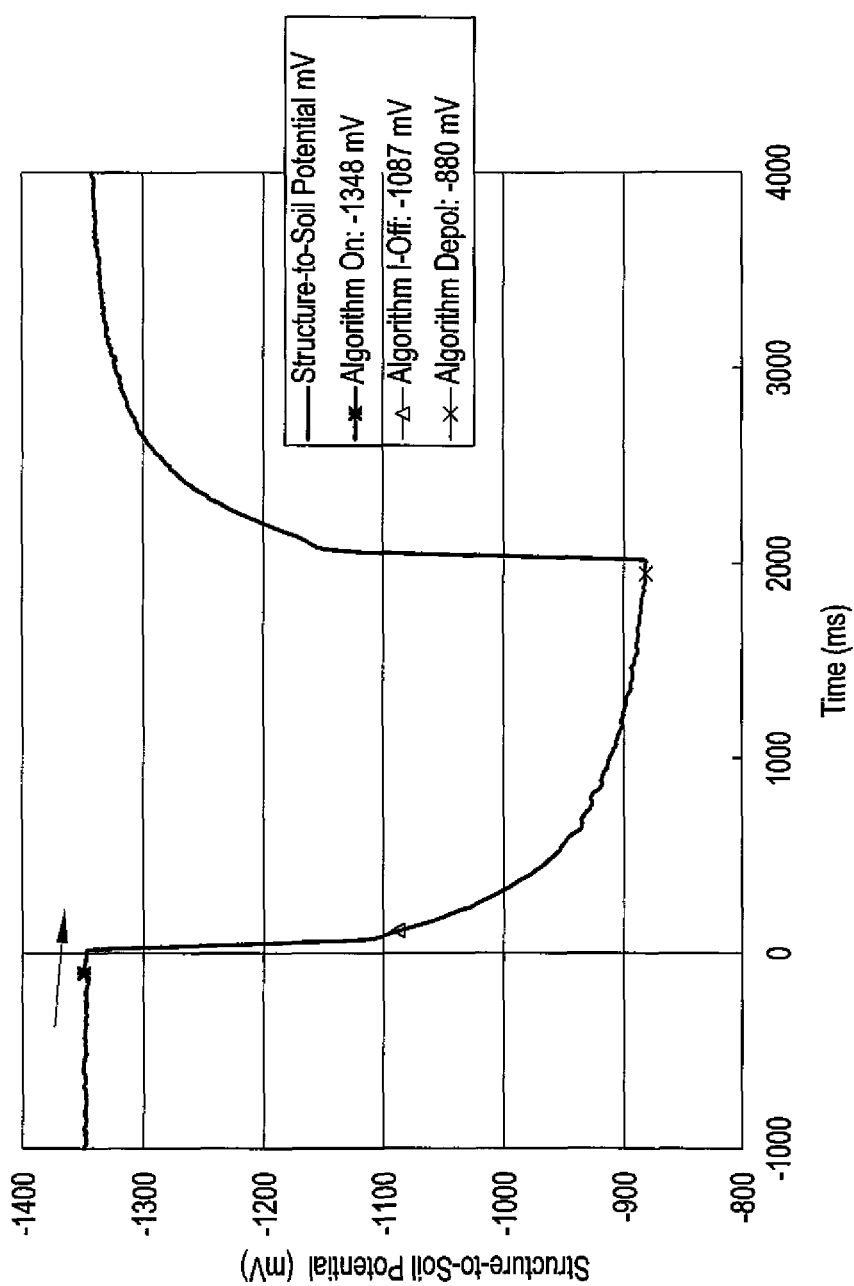
Figure 4C:
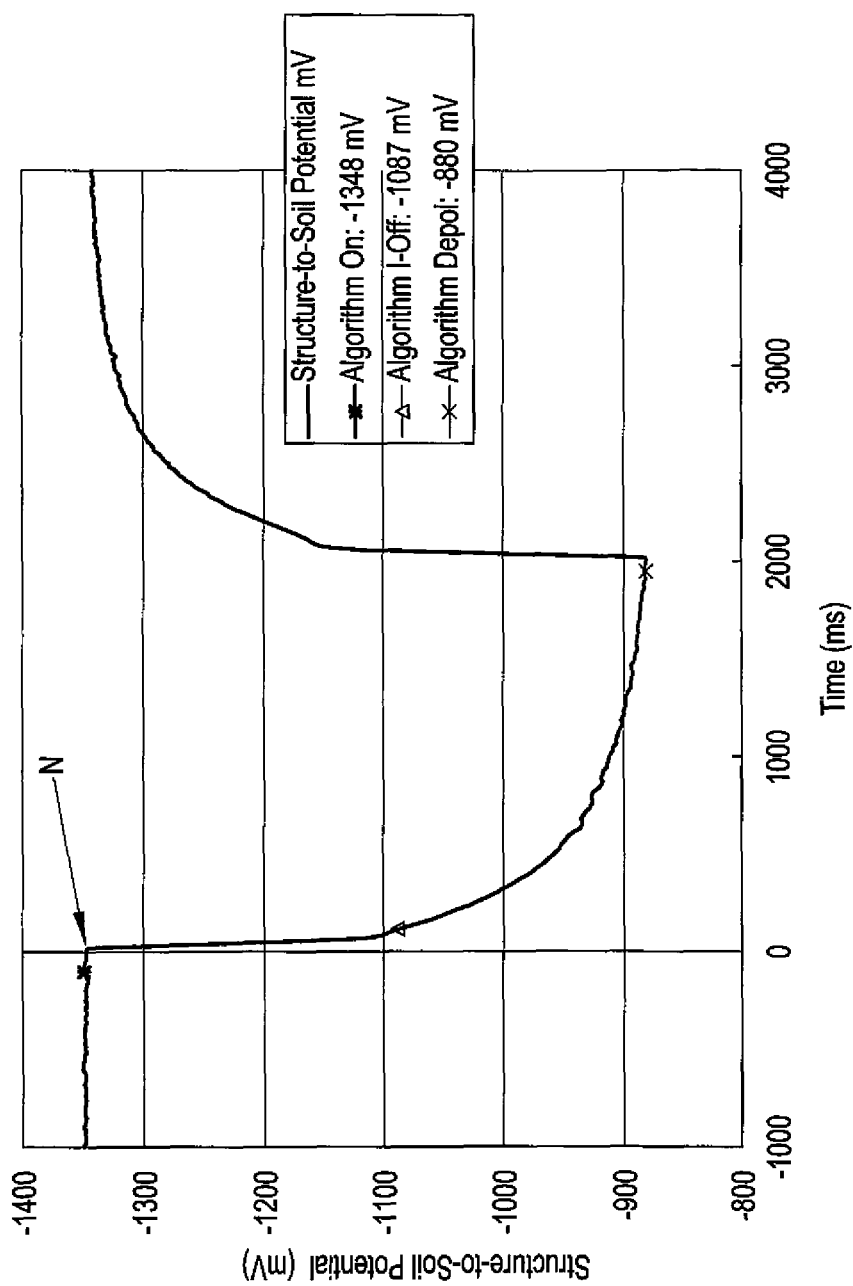
Figure 4D:
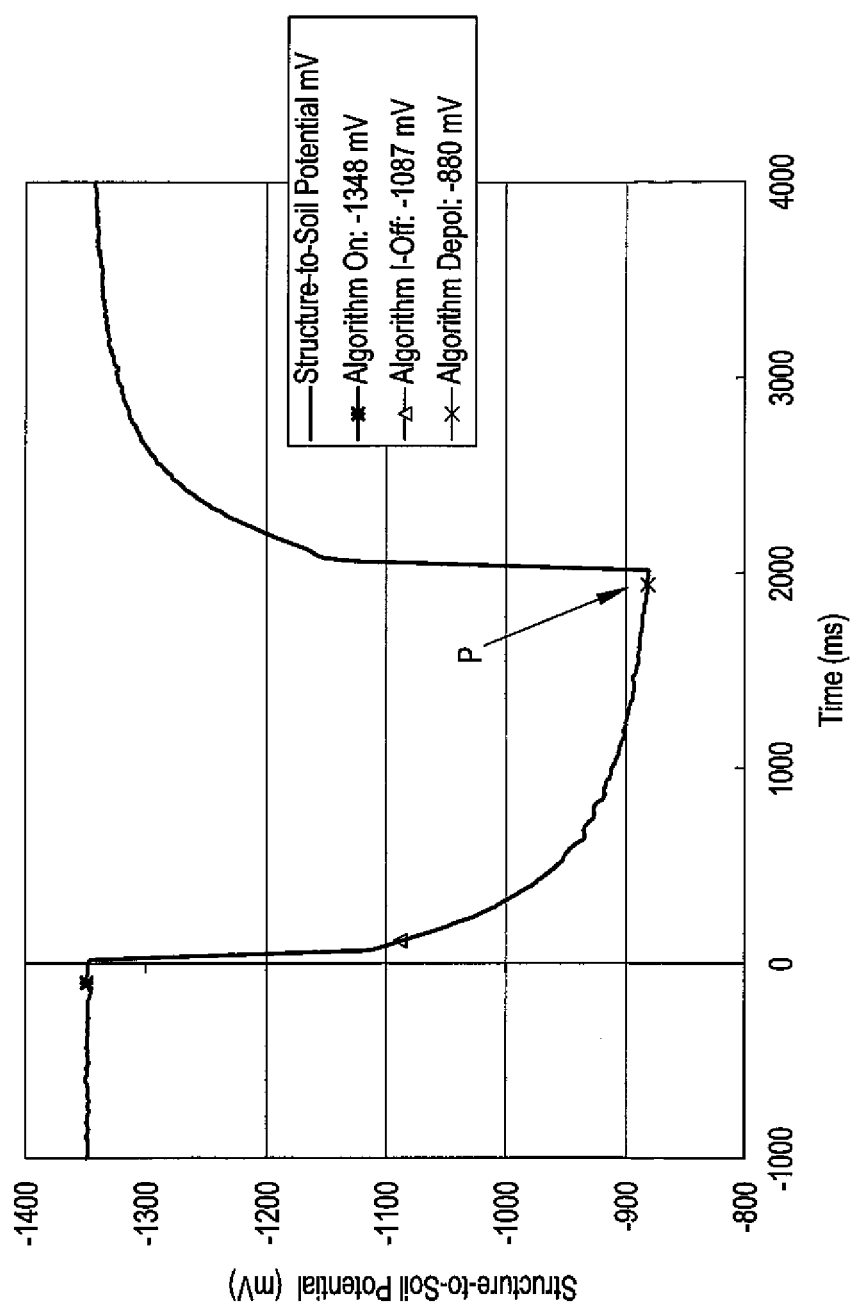
Figure 4E:
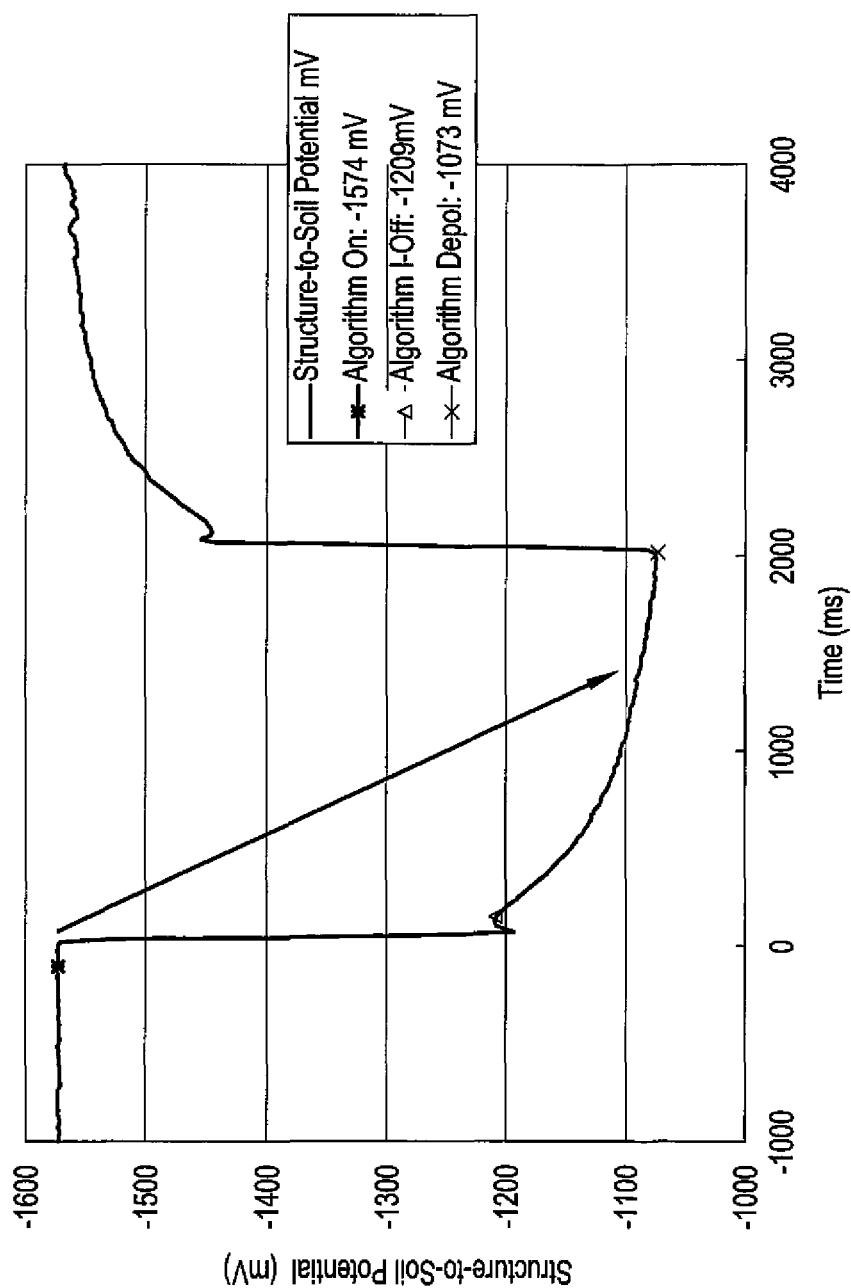

The analysis loop is performed using unfiltered (i.e., not low pass filtered) data. Each time the readings alternate between being closer to the off reference voltage to closer to the on reference voltage, a timer is restarted that is set to a length of time slightly shorter than the established on length. As shown in FIG. 4B, when the timer runs out, the data is parsed, moving forward from a point in time representative of when the timer ran out. The data is analyzed until a negative slope trend is found. In FIG. 4C, the identified point of transition to the negative slope is identified as "N". The estimated time of an on-to-off transition is then reset as the point N. As shown in FIG. 4D, the analysis of the plotted data continues from point N until a transition point to a positive slope (indicated as "P" in FIG. 4D) is identified. As indicated by FIG. 4E, if the point of transition to the positive slope is found before the off-to-on transition, then the system determines the existence of an inductance spike waveform.

Figure 4F:
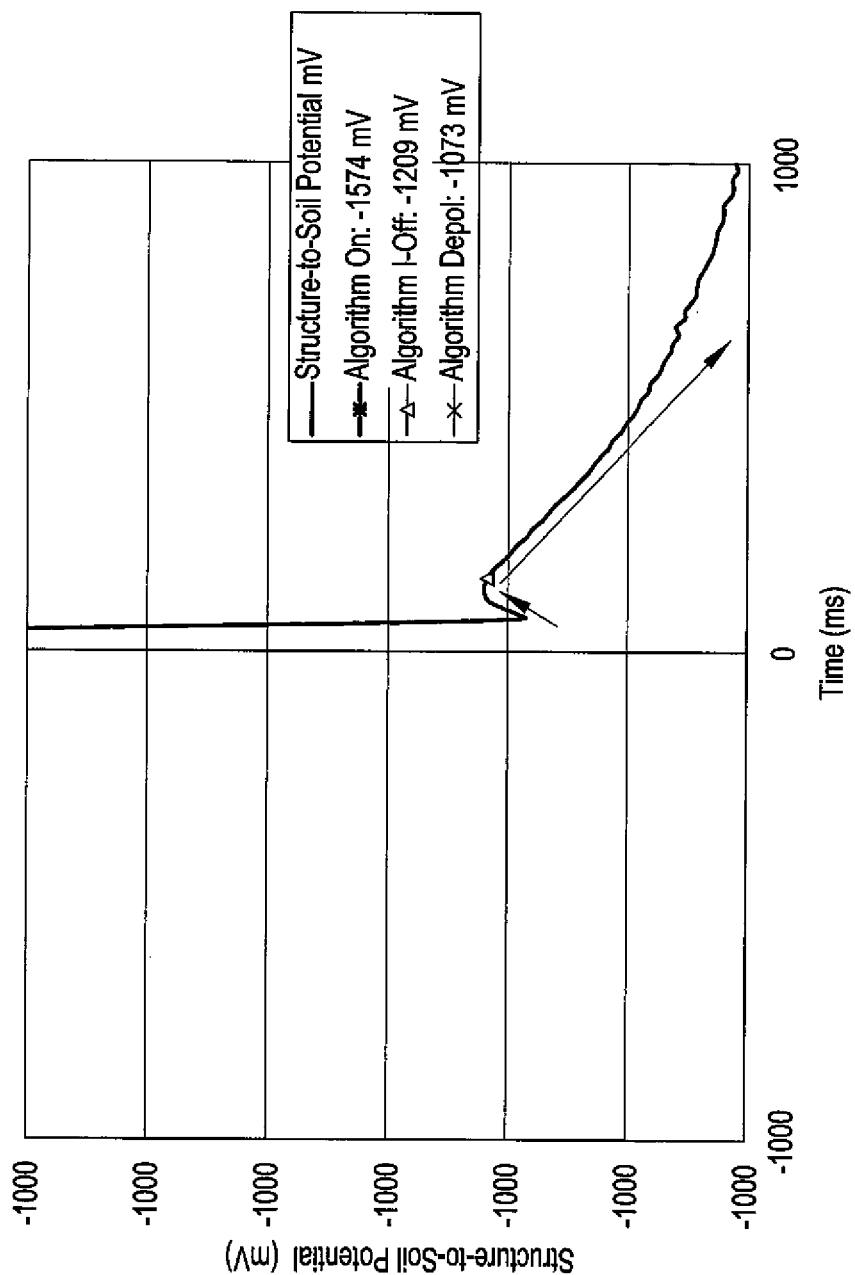
Figure 4G:
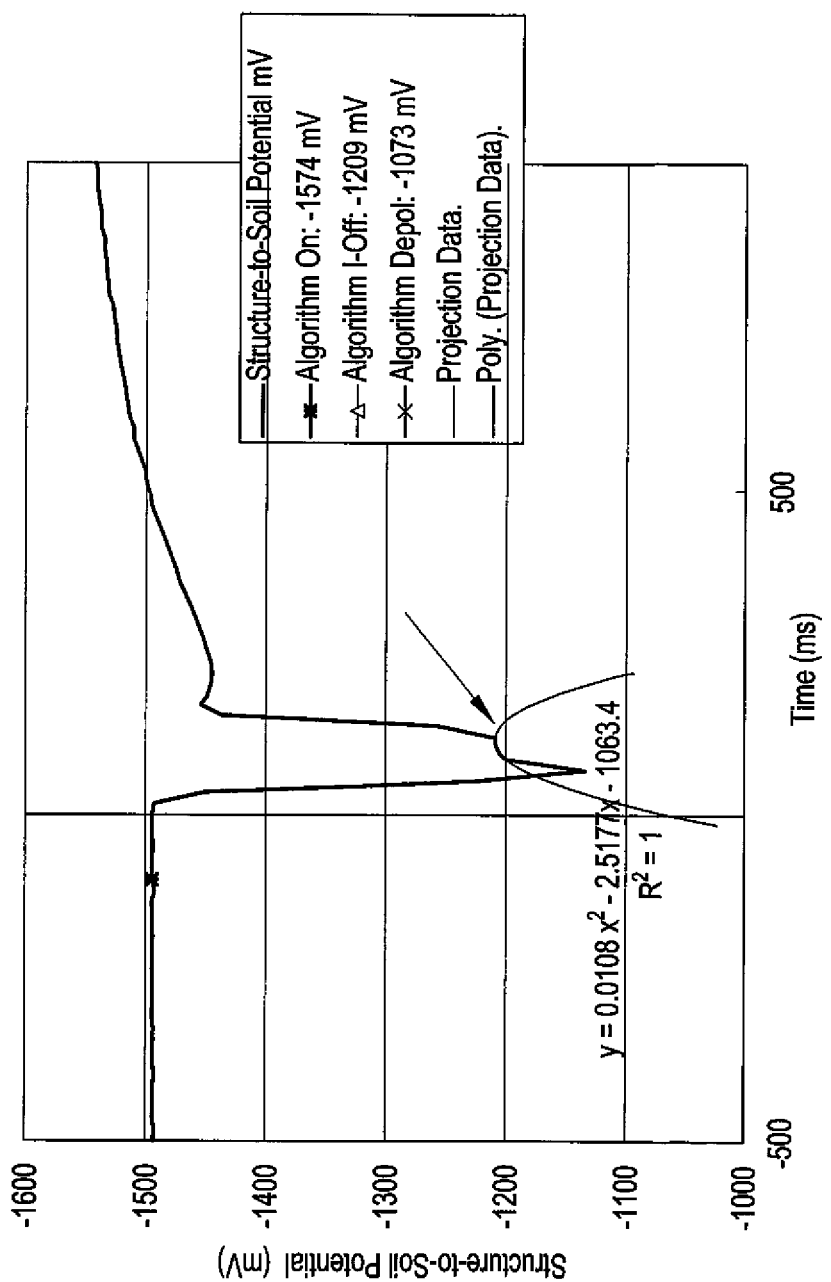

In FIG. 4F, the plotted data is analyzed beyond the point of transition to the positive slope to find a point of transition back to a negative slope. The curve is further analyzed to verify that the curve continues to be negative. If verification is successful, then the time of transition to the negative slope is set as the current instant-off time. FIG. 4G illustrates a situation where no transition back to a negative slope is found. In this case, where no transition is found, the plotted waveform is then curve fit by any suitable type of curve fitting algorithm or software, as is well known in the art, and the system predicts how long it would take for the spike to recover. An "unrecovered spike" warning is then displayed to the user on display 14, along with the magnitude and polarity of the projected voltage error, and a best guess for the time required to obtain an accurate instant-off. Once confirmed by the user, the system 10 may then increase the cycle length and off time accordingly. It should be understood that the polynomial projection shown in FIG. 4G is shown for exemplary purposes only, and only applies to the exemplary data illustratively used in FIG. 4G.

Figure 4H:
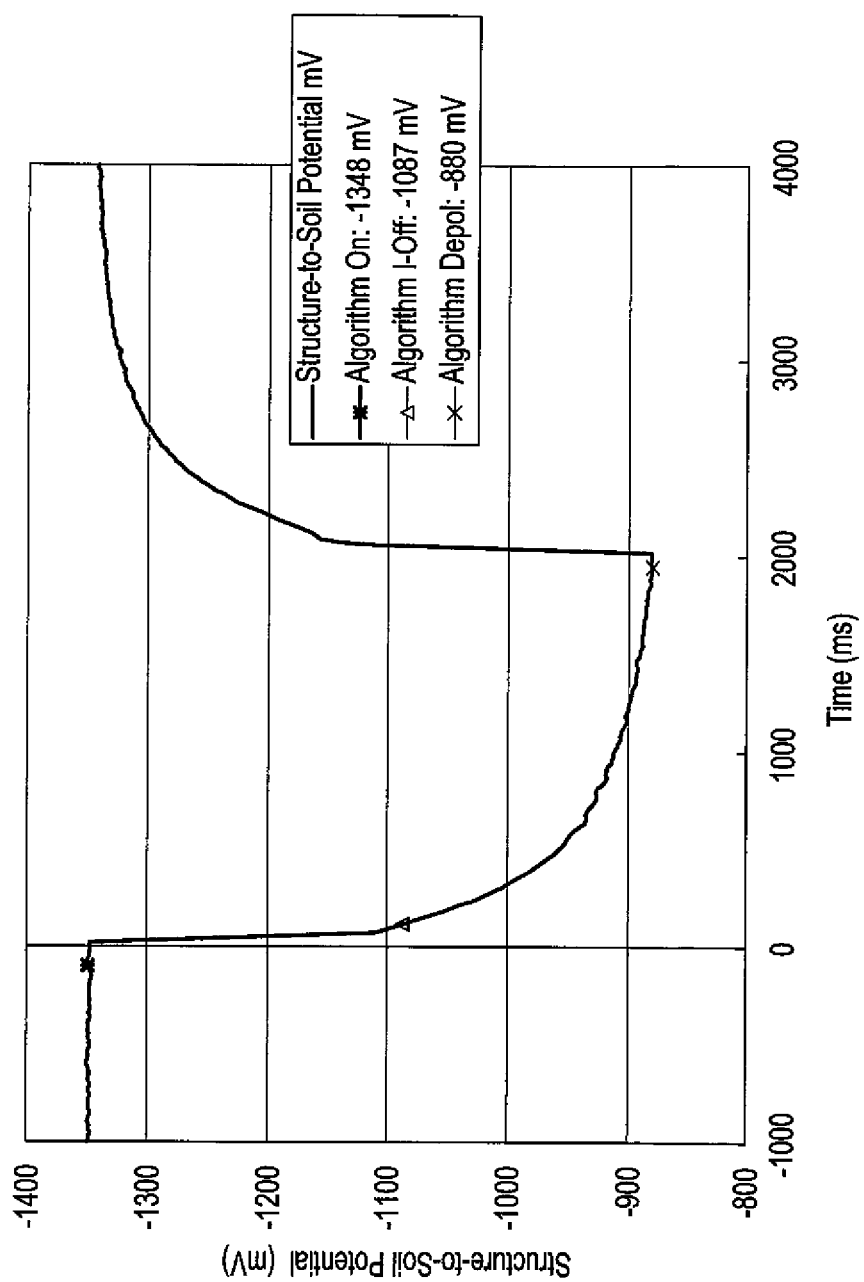
Figure 4I:
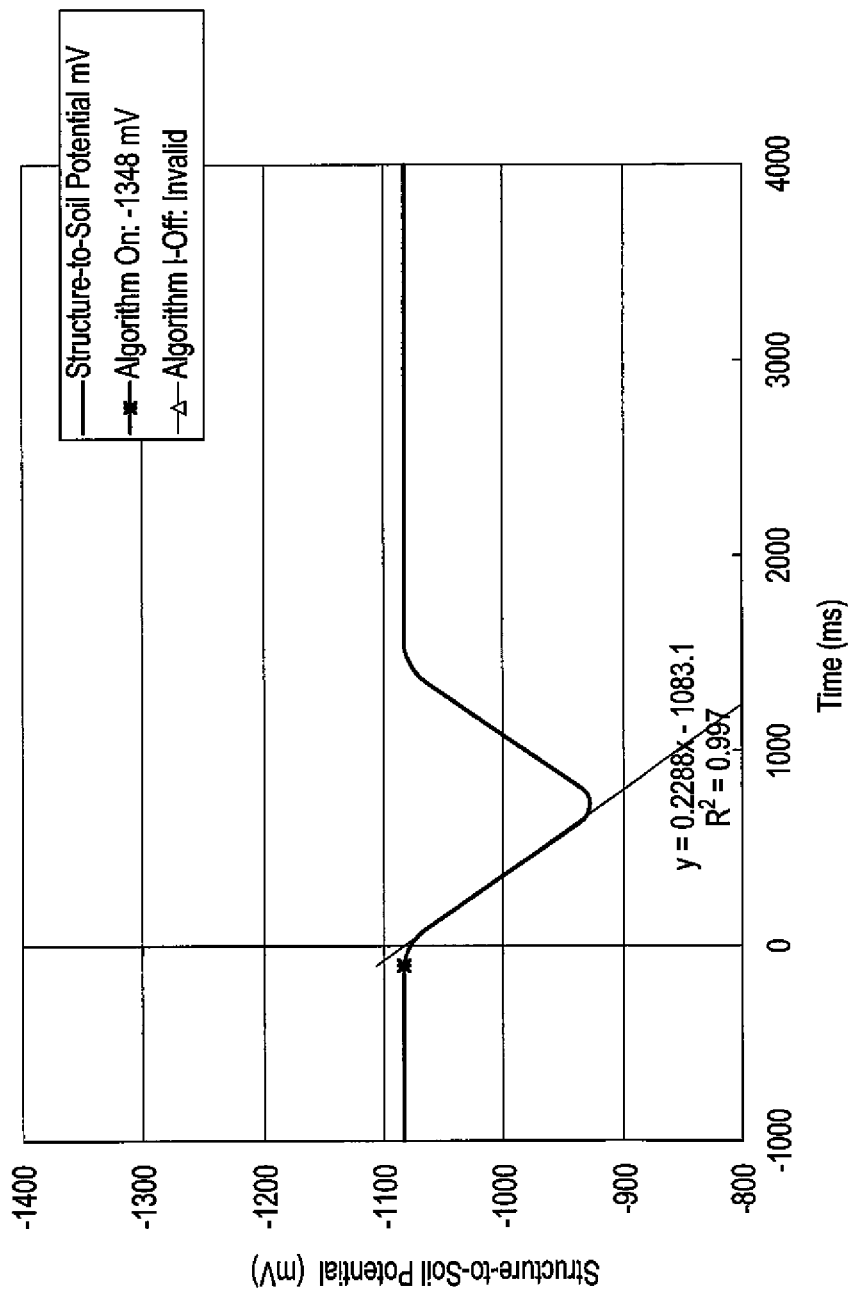
Figure 4J:
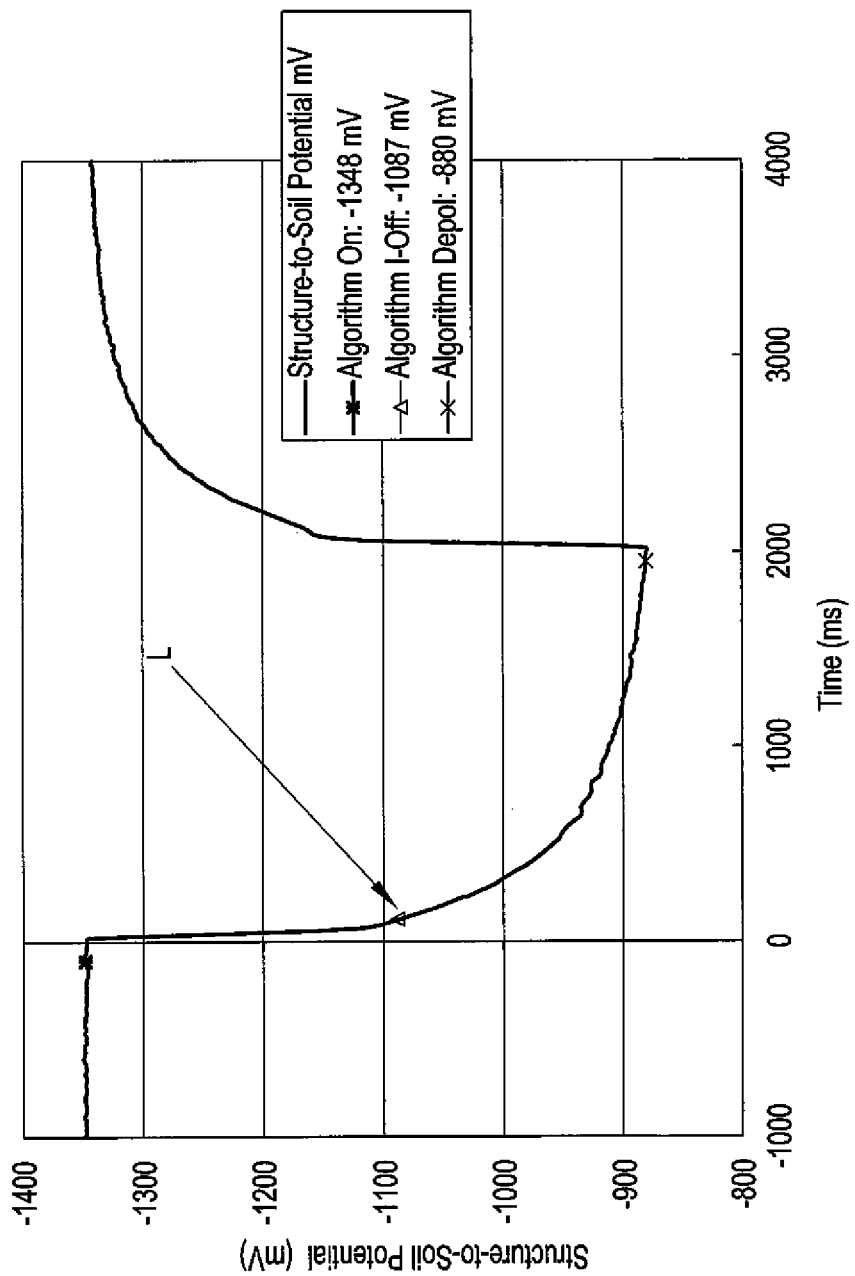

If, however, the transition to the positive slope is not found before the off-to-on transition, as illustrated in FIG. 4H, then a non-spike waveform is determined to exist. In this case, as shown in FIG. 4I, the system then checks to see if a linear curve can be closely fit to the entire off portion of the cycle. If a close fit is found, then the system assumes a non-spike waveform without enough off time to determine a true instant off time. In this case, an "off time too short" error message is delivered to the user via display 14, and the system suggests adjusting input impedance and/or cycle length to correct the problem. If, however, there is no linear curve fit, as indicated by FIG. 4J, the point of largest positive change in the slope (indicated as point "L" in FIG. 4J) is determined, and the time of instant-off is set equal to this time. A curve fit may also be used to identify the time of instant-off.

Figure 4K:
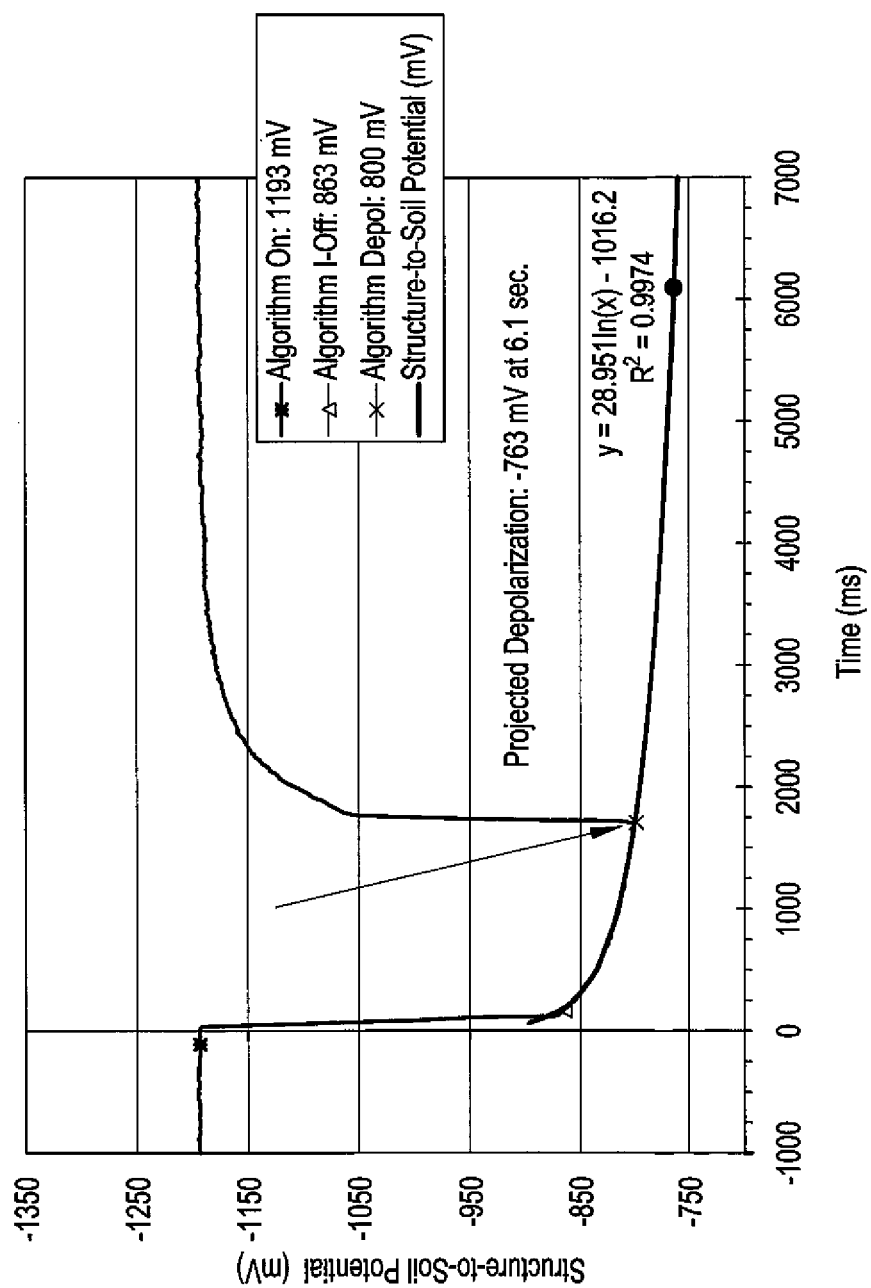

As shown in FIG. 4K, when a waveform with a valid instant-off is identified, the system then finds the last reading before the cathodic protection current interruption cycle turns back on and records this time as the depolarization reading. If the depolarization reading is less than 100 mV greater than the voltage of instant-off, the system curve fits the off portion of the cycle to project a time when 100 mV of depolarization can be achieved. This projected time is then displayed to the user, and a new on-off cycle time is suggested to achieve this depolarization. If the user approves the change, the new cycle is implemented by the system.

In the above, if the instant-off and depolarization readings are available very early in the cycle, the system will suggest a faster cycle that is still long enough to get all of the required data. For example, if the cycle being used is one second off and three seconds on, and the system finds that the instant-off reading is available in the first 60 ms of the cycle with a depolarization time at 200 ms, the system could then suggest a shorter cycle, such as 250 ms off and 750 ms on. The analysis loop ends at this point and then restarts.

By recording and reporting optimal instant-off potentials (FIGS. 4F and 4J), regulated structures, such as oil and gas pipelines and tanks, are more likely to meet regulatory requirements for cathodic protection criteria, thus minimizing cathodic protection system repair and upgrade costs. Further, by identifying and possibly adjusting an interruption cycle that is too short due to capacitance (FIG. 4I) and/or the measuring circuit impedance, recording falsely negative structure-to-soil potentials may be avoided, thus minimizing the risk that failing cathodic protection potentials will be overlooked and underreported to owners, operators and regulatory agencies. This decreased risk will also minimize the risk of an unexpected leak due to corrosion.

Additionally, by identifying or projecting the depolarized potential during the instant-off survey, a secondary depolarized survey may be avoided. Avoiding depolarized surveys reduces costs, but also minimizes the down time for cathodic protection systems, thus minimizing corrosion risks. Further, by identifying the shortest cycle time needed to collect the necessary data, survey labor costs may be minimized by speeding up the survey. Identifying and possibly adjusting an interruption cycle that is too short due to an unrecovered inductance spike (FIG. 4G), and/or projecting the curve to find the most accurate instant-off further results in reporting optimal instant-off potentials outside of the spike, thus minimizing cathodic protection system repair and upgrade costs. Additionally, by identifying inductance in cathodic protection systems, upgrades (such as filters) may be implemented to improve the operation of the systems. The use of waveform analysis also minimizes accuracy errors in surveys that may result in resurveys, thus minimizing costs.

It is to be understood that the present invention is not limited to the embodiments described above, but encompasses any and all embodiments within the scope of the following claims.

We claim:

1. A portable cathodic protection current interrupter, comprising:
   a portable housing;
   a processor disposed within the portable housing;
   a voltage regulator disposed within the portable housing and in communication with the processor, the voltage regulator being adapted for communication with an external power source;
   a display mounted on the portable housing and in communication with the processor;
   a user interface mounted on the portable housing and in communication with the processor;
   an onboard clock disposed within the portable housing and in communication with the processor;
   a global navigation satellite system receiver disposed within the portable housing and in communication with the processor for synchronizing a time signal of the onboard clock;
   computer readable memory disposed within the portable housing and in communication with the processor;
   a plurality of on-board relays in communication with the processor, the on-board relays being adapted for communication with a cathodic protection current source for selectively interrupting current thereto; and means for selectively switching the plurality of relays into operational mode either independently or selective simultaneous combinations between a main interruption channel, a testing interruption channel, and an external interruption channel, wherein:

i) the main interruption channel includes a plurality of on-off current switching cycles, ii) the testing interruption channel for selective independent or simultaneous operation with the main interruption channel, the testing interruption channel includes a plurality of user selectable on-off cycles, further wherein at least one of the user selectable on-off cycles includes the interruption of the cathodic protection current, and iii) the external interruption channel drives an external current relay, further wherein the external interruption channel includes user selectable enabling and disabling modes wherein the enabling mode disables the main and testing channels.

2. The portable cathodic protection current interrupter as recited in claim 1, wherein the main interruption channel has a maximum current of 1 A and a maximum voltage of 20 V.

3. The portable cathodic protection current interrupter as recited in claim 1, wherein the testing interruption channel has a maximum current of 1 A and a maximum voltage of 20 V.

4. The portable cathodic protection current interrupter as recited in claim 1, wherein said at least one on-board relay comprises a solid-state relay and a mechanical relay.

5. The portable cathodic protection current interrupter as recited in claim 1, further comprising a rechargeable battery disposed within said portable housing.

6. The portable cathodic protection current interrupter as recited in claim 5, further comprising a battery charger disposed within said portable housing for recharging the rechargeable battery, the battery charger being in communication with the voltage regulator.

7. The portable cathodic protection current interrupter as recited in claim 6, further comprising a battery gauge mounted on said portable housing for visually indicating a state of charge of the rechargeable battery.

8. The portable cathodic protection current interrupter as recited in claim 1, further comprising an analog-to-digital converter in communication with said processor.

9. The portable cathodic protection current interrupter as recited in claim 1, further comprising a communication interface in communication with said processor for receiving external control signals.

10. The portable cathodic protection current interrupter as recited in claim 9, wherein the communication interface is a wireless communication interface.

11. The portable cathodic protection current interrupter as recited in claim 1, further comprising at least one solar panel mounted on said portable housing.

12. The portable cathodic protection current interrupter as recited in claim 1, wherein the computer readable memory has a set of instructions for recording, analyzing and identifying waveforms produced by the interruption of the cathodic protection current, the instructions including at least a first set of instructions which, when loaded into computer readable memory and executed by the processor, causes the processor to identify changes in slope of the waveforms.

13. The portable cathodic protection current interrupter as recited in claim 12, wherein the instructions include at least a second set of instructions which, when loaded into computer readable memory and executed by the processor, causes the processor to alter the on-off current switching cycles and communicate such alterations to the plurality of on-board relays.

14. A method of controlling a cathodic protection current interrupter, comprising the steps of:

(a) buffering incoming data representative of cathodic protection current samples obtained by a cathodic protection current interrupter in computer readable memory;

(b) low pass filtering the incoming data and recording minimum and maximum values thereof in the computer readable memory;

(c) comparing the low pass filtered incoming data against the recorded minimum and maximum values, and:

if the low pass filtered incoming data is closer to the recorded minimum value than the recorded maximum value, then incrementing an integer variable, minCount, by one, where minCount represents a number of data points closer to the recorded minimum value than the recorded maximum value; and if the low pass filtered incoming data is closer to the recorded maximum value than the recorded minimum value, then incrementing another integer variable, maxCount, by one, where maxCount represents a number of data points closer to the recorded maximum value than the recorded minimum value;

(d) determining the smaller of minCount and maxCount to be representative of an off portion of a cathodic protection interruption cycle, and determining the larger of minCount and maxCount to be representative of an on portion of the cathodic protection interruption cycle;

(e) recording a polarity of the on portion of the cathodic protection interruption cycle and a polarity of the off portion of the cathodic protection interruption cycle in the computer readable memory, the polarity of the on portion of the cathodic protection interruption cycle and the polarity of the off portion of the cathodic protection interruption cycle being represented as variables onPolarity and offPolarity, respectively;

(f) establishing a variable onCount, the variable onCount being representative of a duration of the on portion of the cathodic protection interruption cycle and being derived from the larger of minCount and maxCount, and establishing a variable offCount, the variable offCount being representative of a duration of the off portion of the cathodic protection interruption cycle and being derived from the smaller of minCount and maxCount;

(g) establishing an on reference voltage, corresponding to the "on" portion of the cathodic protection interruption cycle, and an off reference voltage, corresponding to the "off" portion of the cathodic protection interruption cycle, and setting the on reference voltage and the off reference voltage to the recorded minimum value and the recorded maximum value, respectively;

(h) starting a countdown timer and re-starting the countdown timer each time the incoming data alternates between being closer to the off reference voltage and being closer to the on reference voltage;

(i) when the countdown timer ceases counting, analyzing the buffered data over a time range beyond a time when the countdown timer ceased counting to determine a point of transition to a negative slope;

(j) setting an estimated time of on-to-off transition as the determined point of transition to the negative slope;

(k) analyzing the buffered data over a time range beyond the estimated on-to-off transition time to determine if a point of transition to a positive slope exists;

(l) determining the existence of an inductance spike waveform if the point of transition to the positive slope is found and is positioned before an off-to-on transition of the cathodic protection current interruption cycle;

(m) analyzing the buffered data over a time range beyond the point of transition to the positive slope when the point of transition to the positive slope is found to determine whether a point of transition to a negative slope exists, and setting a time of current instant-off equal to the time of the point of transition to the negative slope;

(n) determining an existence of a non-spike waveform if the point of transition to the positive slope is not found before the off-to-on transition of the cathodic protection current interruption cycle;

(o) determining if the off portion of the cathodic protection current interruption cycle has a linear curve fit if a non-spike waveform exists;

(p) determining a point of greatest positive change in the slope of the off portion of the cathodic protection current interruption cycle if there is no linear curve fit, and setting a time of instant-off equal to the time of the point of greatest positive change in the slope;

(q) for a time period after the time of instant-off, determining a time of transition to a successive "on" portion of the cathodic protection current interruption cycle, and setting a time of depolarization equal to the time of transition; and (r) if a difference between a depolarization voltage corresponding to the time of depolarization and an instant-off voltage corresponding to the time of instant-off is less than 100 mV, then curve fitting the "off" portion of the cathodic protection current interruption cycle to determine a projected time required to achieve a difference of 100 mV and recording the projected time.

\* \* \* \* \*